US011514256B2

(12) United States Patent
Sato et al.

(10) Patent No.: US 11,514,256 B2
(45) Date of Patent: Nov. 29, 2022

(54) PRINTING INSPECTION DEVICE

(71) Applicant: Hitachi Industrial Equipment Systems Co., Ltd., Tokyo (JP)

(72) Inventors: Takashi Sato, Tokyo (JP); Muneaki Watanabe, Tokyo (JP); Hiroko Kurihara, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/281,787

(22) PCT Filed: Sep. 25, 2019

(86) PCT No.: PCT/JP2019/037463
§ 371 (c)(1),
(2) Date: Mar. 31, 2021

(87) PCT Pub. No.: WO2020/071188
PCT Pub. Date: Apr. 9, 2020

(65) Prior Publication Data
US 2021/0383087 A1  Dec. 9, 2021

(30) Foreign Application Priority Data
Oct. 1, 2018 (JP) ............................ JP2018-186328

(51) Int. Cl.
*G06K 7/10* (2006.01)
*G06K 7/14* (2006.01)
*G06T 7/00* (2017.01)

(52) U.S. Cl.
CPC .......... *G06K 7/1417* (2013.01); *G06T 7/0004* (2013.01); *G06T 2207/30144* (2013.01)

(58) Field of Classification Search
CPC ...... G06K 5/02; G06K 7/1417; G06K 7/1439; G06T 2207/30144; G06T 7/0004; G06T 7/11; G06T 7/136
See application file for complete search history.

(56) References Cited

U.S. PATENT DOCUMENTS

| 9,135,489 B2 | 9/2015 | Zhang et al. |
| 9,230,148 B2 | 1/2016 | Zhang et al. |

(Continued)

FOREIGN PATENT DOCUMENTS

| JP | 2005-165949 A | 6/2005 |
| JP | 2009-32202 A | 2/2009 |

(Continued)

OTHER PUBLICATIONS

International Search Report (PCT/ISA/210) issued in PCT Application No. PCT/JP2019/037463 dated Dec. 17, 2019 with English translation (three (3) pages).

(Continued)

*Primary Examiner* — Thien M Le
(74) *Attorney, Agent, or Firm* — Crowell & Moring LLP

(57) ABSTRACT

To obtain a printing inspection device that an optimum binarization threshold value in the printing inspection device that captures an image including a two-dimensional code printed by a general-purpose printer such as an ink jet printer, as a multi-level image, creates a binary image from the multi-level image with a predetermined binarization threshold value, and then performs decoding. Before a practical printing inspection is performed, a read test is performed. The read test is performed on one or more inspection samples by binarizing a multi-level image with brightness values for all gradations as a threshold value. A range (maximum value and minimum value) of readable brightness values is obtained, and then a median value between the minimum value and the maximum value is used (Continued)

as a binarization threshold value for a two-dimensional code image in a practical printing inspection.

2 Claims, 9 Drawing Sheets

(56) References Cited

U.S. PATENT DOCUMENTS

| | | | | |
|---|---|---|---|---|
| 2007/0008355 | A1* | 1/2007 | Miyamoto | H04N 1/4015 |
| | | | | 347/9 |
| 2008/0316253 | A1* | 12/2008 | Inuoe | B41J 2/16585 |
| | | | | 347/33 |
| 2009/0244165 | A1* | 10/2009 | Saita | B41J 29/393 |
| | | | | 347/19 |
| 2010/0238459 | A1* | 9/2010 | Yamazaki | G06K 15/105 |
| | | | | 358/1.5 |
| 2011/0169853 | A1* | 7/2011 | Oiwa | G06T 11/203 |
| | | | | 345/589 |
| 2013/0094733 | A1* | 4/2013 | Nosato | G06V 20/695 |
| | | | | 382/128 |
| 2018/0373472 | A1* | 12/2018 | Itoh | G06F 3/1208 |
| 2019/0248154 | A1* | 8/2019 | Hiramoto | B41J 2/2139 |
| 2019/0335033 | A1* | 10/2019 | Huang | G06Q 10/20 |
| 2020/0242751 | A1* | 7/2020 | Li | H04N 5/247 |

FOREIGN PATENT DOCUMENTS

| | | |
|---|---|---|
| JP | 2009-70061 A | 4/2009 |
| JP | 2011-233099 A | 11/2011 |
| JP | 2016-218816 A | 12/2016 |

OTHER PUBLICATIONS

Japanese-language Written Opinion (PCT/ISA/237) issued in PCT Application No. PCT/JP2019/037463 dated Dec. 17, 2019 (three (3) pages).

Extended European Search Report issued in European Application No. 19869212.1 dated Jun. 3, 2022 (nine (9) pages).

* cited by examiner

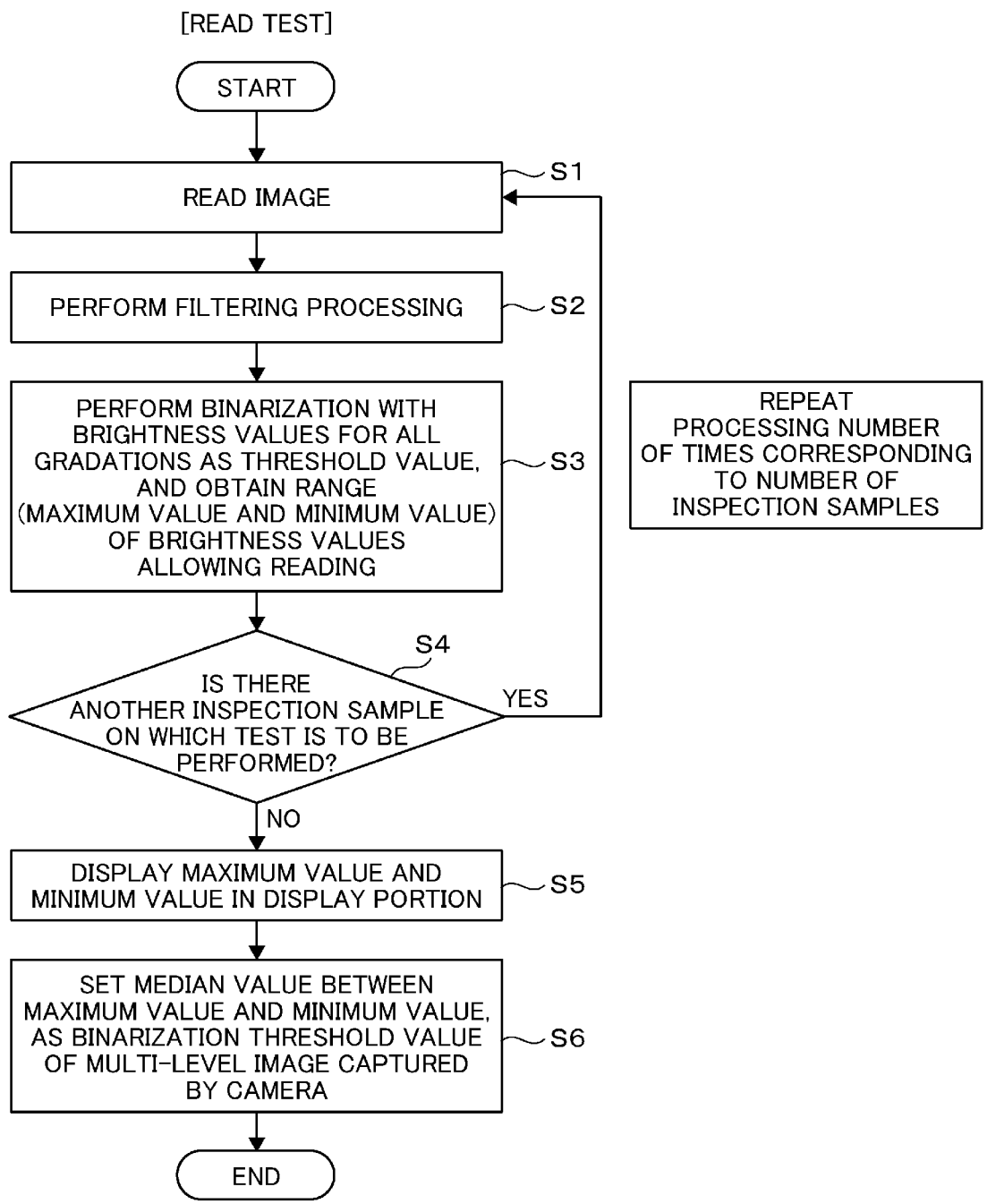
F I G. 1

F I G. 2
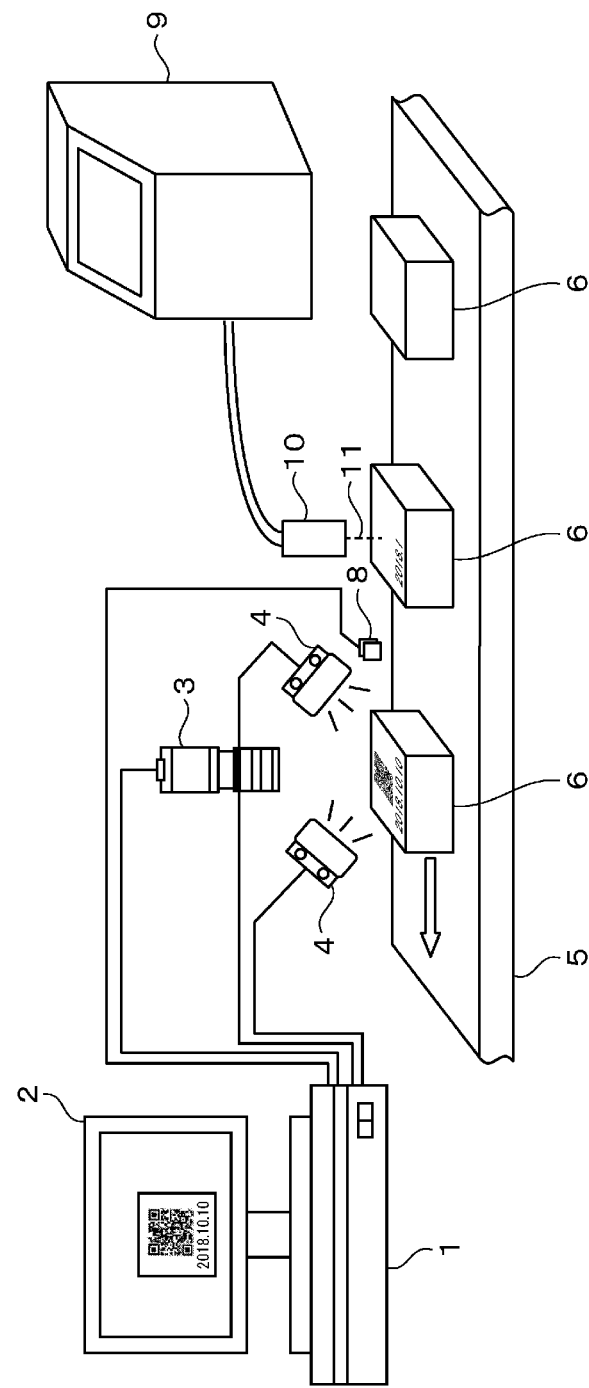

PRINTING INSPECTION DEVICE

TECHNICAL FIELD

The present invention relates to a printing inspection device and particularly relates to a printing inspection device suitable for reading a two-dimensional code (simply referred to as a "character" below because a symbol or the two-dimensional code is included in a character) with a camera and determining the quality of printing, the two-dimensional code in which, for example, characters and symbols such as the production date or a serial number printed by an inkjet printer and the like and information necessary for production history management are recorded.

BACKGROUND ART

As the background art of a printing inspection device, there is JP 2009-70061 A (Patent Document 1). JP 2009-70061 A discloses that "in a case where decoding of a two-dimensional code fails, when cells forming one pattern among black and white patterns forming a specific pattern completely coincide with cells forming a predetermined pattern, and the coincidence degree of another pattern is out of a predetermined range, a binarization parameter is adjusted to cause the coincidence degree to enter into the predetermined range, and binarization is performed again to decode a binary image".

CITATION LIST

Patent Document

Patent Document 1: JP 2009-70061 A

SUMMARY OF THE INVENTION

Problems to be Solved by the Invention

Labeling of the production date, the expiration date, the production lot, and the like is legally required for packing containers for foods and chemicals. A printing device such as an ink jet printer is used to realize the labeling. The printing device is installed on a transport line (including a packing line) and performs printing on a packing container which is transported one after another. A printing inspection device that reads printing of the packing container determines whether or not printing by the printing device is correctly performed. Further, in recent years, in order to record various types of information necessary for production history management in addition to the above printing, it is increasing to simultaneously perform printing of two-dimensional codes capable of recording multiple pieces of information. Thus, it is also required to inspect whether information of the two-dimensional code is correctly printed.

However, the device disclosed in Patent Document 1 focuses only on the ratio of white and black. In practice, the position of a cell after binarization is determined to be largely shifted by the degree of position shift of the cell to the pixel, and thus it may not be possible to read the two-dimensional code.

Thus, an object of the present invention is to obtain a printing inspection device that obtains an optimum binarization threshold value in the printing inspection device that captures an image including a two-dimensional code printed by a general-purpose printer such as an ink jet printer, as a multi-level image, creates a binary image from the multi-level image with a predetermined binarization threshold value, and then performs decoding.

Solutions to Problems

To solve the above problems, for example, the configuration described in the claims is adopted. The present application includes a plurality of means for solving the above problems. According to an example, a printing inspection device reads printing including a two-dimensional code printed on a printing target. The printing inspection device includes means for inputting a recognition target including a two-dimensional code in a form of a multi-level image, image binarization means for binarizing the multi-level image with a predetermined binarization threshold value and outputting a binary image, two-dimensional code detection means for detecting a region of a two-dimensional code from the binary image, decoding means for decoding the two-dimensional code, and read test means for performing a read test. The read test means performs a read test by binarizing one or more inspection samples with brightness values for all gradations, as a threshold value, obtains a maximum value and a minimum value of readable brightness values, causes the obtained maximum value and minimum value to be displayed in a display portion, and sets a median value between the minimum value and the maximum value, as a binarization threshold value for a two-dimensional code image in a practical printing inspection.

Effects of the Invention

According to the present invention, it is possible to provide a printing inspection device capable of obtaining an optimum binarization threshold value when a binary image is created from a multi-level image with a predetermined binarization threshold value, and then decoding is performed.

BRIEF DESCRIPTION OF THE DRAWINGS

FIG. 1 illustrates an example of a flowchart for describing processing after image capturing in a read test step of a processing unit in Example 1.

FIG. 2 is a diagram illustrating an installation example of a printing inspection device in Example 1.

MODE FOR CARRYING OUT THE INVENTION

Figure 3:
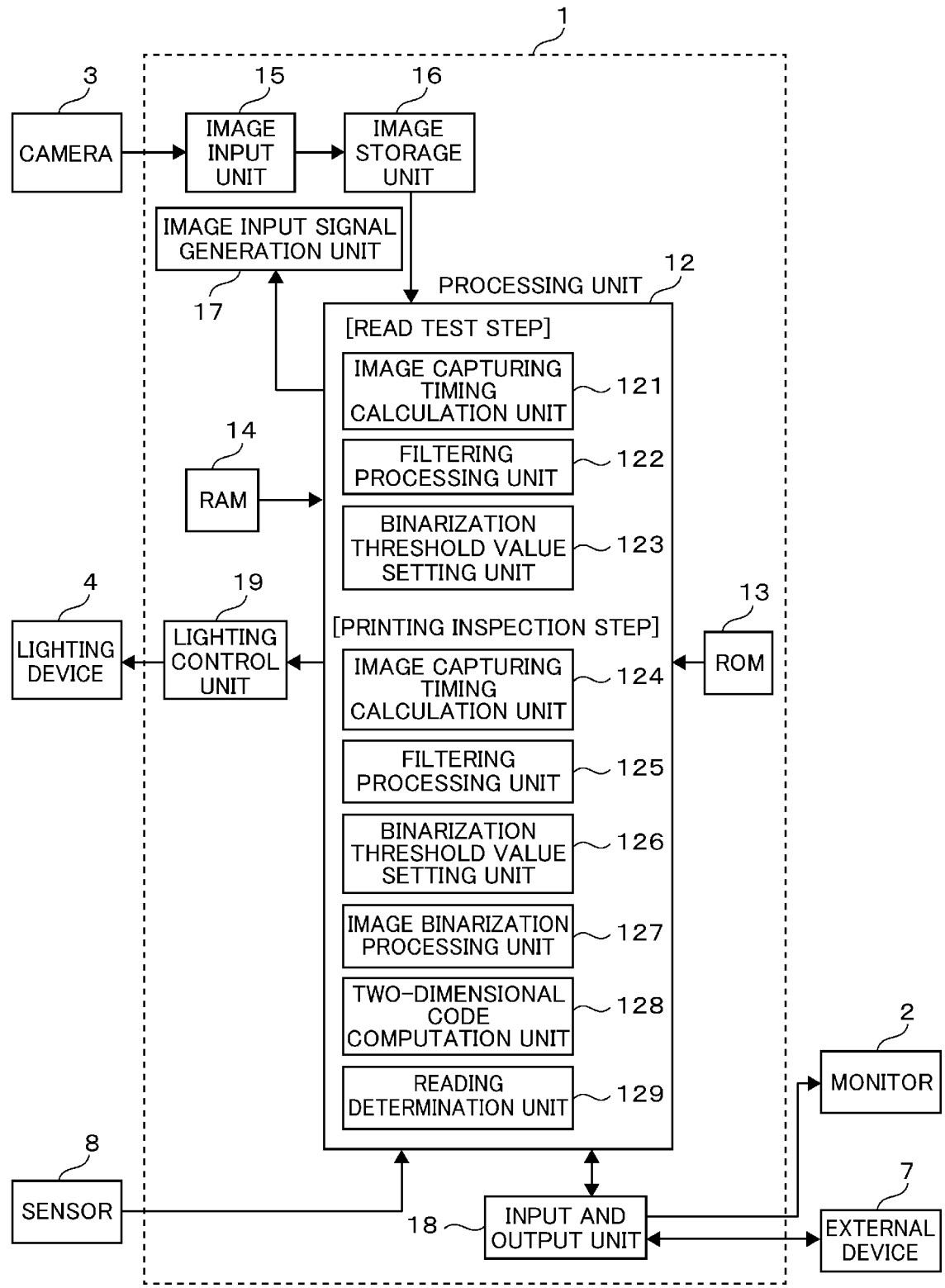
FIG. 3 is a block diagram illustrating the printing inspection device in Example 1.

Hereinafter, examples of the present invention will be described with reference to the drawings.

Example 1

FIG. 2 illustrates an installation example of a printing inspection device used in the present example. In FIG. 2, the printing inspection device includes a lighting device 4, a camera 3, a monitor 2, a printing inspection-device body 1, an external device, and the like. The lighting device 4 irradiates a printed matter 6 with light having a light quantity sufficient to cause the camera 3 to read a printed character. The printed matter 6 is obtained in a manner that a printing device such as an ink jet printer 9 performs printing on a packing container for foods and chemicals. The camera 3 refers to image capturing means for reading an image including a character string, a two-dimensional code, or the like, which serves as an inspection target in the printed matter 6 with which the light is irradiated. The monitor 2 displays the read image or displays condition settings of an inspection and an inspection result. A processing unit and a lighting control unit are mounted in the printing inspection-device body 1. The processing unit performs processing, for example, extracting a print image from an image read from the camera 3 and performs acceptance determination of an inspection target character. The lighting control unit controls the light quantity, the timing, and the like of lighting. The external device transmits various instructions of image processing and the like to the processing unit in the printing inspection-device body 1.

In manufacturing factories for beverages and canned PET bottles, droplets 11 are discharged onto the surface of a bottle or a can being a product before shipment, by a print head 10 of a dedicated ink jet printer 9 to perform printing of the expiration date, the serial number, a two-dimensional code, and the like. A product 6 before shipment, on which printing is performed by the ink jet printer 9, is transported by a conveyor 5 or the like. The processing unit in the printing inspection-device body 1 detects an output signal from a sensor 8 installed in the vicinity of the conveyor, and calculates an image capturing timing of the camera 3. At a timing at which the product is transported to a position allowing the camera 3 to recognize an inspection target character, the lighting device 4 such as an LED lighting performs irradiation with light, and the camera 3 reads an image including the inspection target character. Then, a print image is transmitted into the printing inspection-device body 1.

FIG. 3 is a block diagram illustrating an example of the printing inspection device in the present example. A program for recognition processing of a printing character string, a two-dimensional code, or the like or a program for acceptance determination of printing quality is stored in a ROM 13. In addition, a reference character pattern of constituent characters of a character string as an inspection target, setting data input from the external device 7, and the like are stored in a RAM 13. The processing unit 12 performs various types of processing related to the printing inspection.

Firstly, a read test is performed using a test inspection sample in order to determine a binarization threshold value. When the processing unit 12 in the printing inspection-device body 1 receives the output signal of the sensor 8, an image capturing timing calculation unit 121 in the processing unit calculates an image capturing timing of the camera.

An image input signal generation unit 17 notifies the camera 3 of an image capturing timing in response to an instruction from the processing unit 12. In addition, in response to an instruction from the processing unit 12, the lighting control unit 19 controls the light quantity of the lighting device 4 and controls an emission timing of the lighting device 4 in accordance with an image reading timing of the camera 3.

The image read by the camera 3 is multi-level image data in which each pixel has a numerical value (referred to as a "brightness value" below) depending on the brightness among the number of gradations determined by the performance of the camera. The data is input to an image input unit 15 in the printing inspection-device body 1, and stored once in an image storage unit 16. A filtering processing unit 122 in the processing unit 12 performs image improvement processing such as thinning and thickening on the captured image stored in the image storage unit 16, in order to easily recognize a two-dimensional code. A binarization threshold value setting unit 123 acquires an optimum binarization threshold value for the image subjected to filtering processing, in accordance with the procedure described later.

Then, the practical printing inspection is performed. With the method similar to that in the read test, the output signal of the sensor 8 is received. An image capturing timing calculation unit 124 in the processing unit 12 calculates the image capturing timing of the camera. The camera 3 performs image capturing to obtain multi-level image data. A filtering processing unit 125 in the processing unit 12 performs image improvement processing on the multi-level image data. A binarization threshold value setting unit 126 sets the optimum binarization threshold value based on the binarization threshold value obtained in [read test step]. An image binarization processing unit 127 performs binarization processing using the binarization threshold value obtained by the binarization threshold value setting unit 126, so as to create a binary image from the multi-level image. A two-dimensional code computation unit 128 detects a region of the two-dimensional code from the obtained binary image, reads data of the two-dimensional code, and decodes the two-dimensional code. Then, a reading determination unit 129 performs acceptance determination and transmits the determination result to an input and output unit 18. The determination result is displayed on the monitor 2. When the determination result means failure, the external device 7 rejects the product as a defective product. Further, in the above series of processing, the print image, an inspection condition, and the like are also transmitted to the input and output unit 18 and then are displayed on the monitor 2.

FIG. 1 illustrates an example of a flowchart of processing after image capturing in the [read test step] of the processing unit 12 in the printing inspection device in the present example. As described with reference to FIG. 3, the processing unit 12 in the printing inspection-device body receives the output signal of the sensor 8, and then the image is read by the camera 3 at a predetermined timing. The read image is stored once in the image storage unit 16 in Step S1.

Then, in Step S2, the filtering processing unit 122 in the processing unit 12 performs image improvement processing. Steps S3 to S6 represent processing of the binarization threshold value setting unit 123 in the processing unit 12. In Step S3, regarding an image after filtering processing, binarization is performed with the brightness values for all gradations as a threshold value, and it is checked whether or not a two-dimensional code is read. For example, in a case of an image having 256 gradations, it is checked whether or not a two-dimensional code can be read, for all binarization threshold values of 0 to 255. The minimum brightness threshold value allowing a two-dimensional code to be read is set as MIN1, and the maximum brightness threshold value is set as MAX1. In Step S4, it is determined whether there is another inspection sample on which the read test is to be performed. Regarding the number of inspection samples, one piece is possible, and two or more pieces are desirable to improve accuracy against variation. When two or more inspection samples are provided, processing from Step S1 is also performed on the second and the subsequent inspection samples. The minimum brightness threshold values MIN2, MIN3, . . . and the maximum brightness threshold values MAX2, MAX3, . . . which are obtained by performing the processing up to Step S3 are obtained. In addition, the minimum brightness threshold values and the maximum brightness threshold values corresponding to the number of inspection samples are obtained. The average values are obtained from the brightness threshold values and set as the minimum brightness value MIN and the maximum brightness value MAX.

Figure 4:
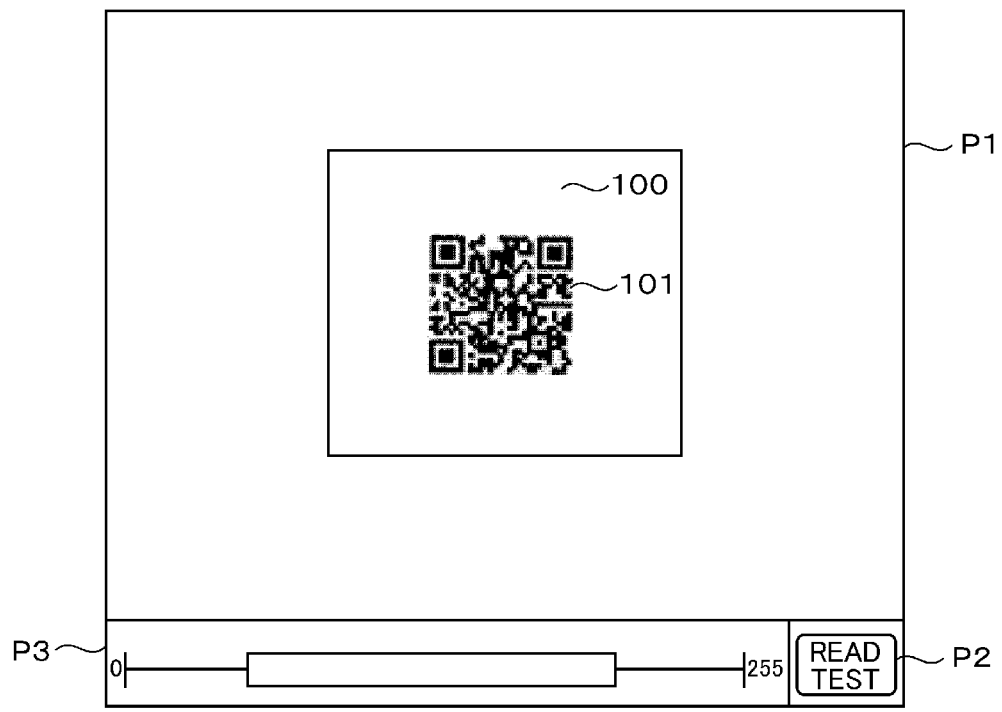
FIG. 4 illustrates a display example of a monitor in Example 1.

In Step S5, the minimum brightness value MIN and the maximum brightness value MAX are transmitted to the input and output unit 18 and displayed on the monitor 2. FIG. 4 illustrates a display example. A two-dimensional code-image display portion P1 represents an image capturing region of the camera 3. A white region 100 including a two-dimensional code image at the center is a reading region. The reading region is set on an inspection condition setting screen (not illustrated). When the captured image is located out of this region, the product is considered as a printed matter having a printing position deviation which is larger than an allowable range, and thus is determined as a defective product. As an example of a two-dimensional code image 101 at the center of the region 100, an image of a QR code (registered trademark) is displayed. When a "read test" button is pressed, Step S3 is performed. The result is displayed on the left of the "read test" button. "0" indicates the minimum value of the binarization threshold value for performing the read test, and "255" indicates the maximum value of the binarization threshold value for performing the read test. A rectangle between the numerical values indicates the range of the binarization threshold value allowing a two-dimensional code to be read. FIG. 4 illustrates that a two-dimensional code can be read in a range of the binarization threshold value from "51" to "198". In Step S6, the median value is obtained from the minimum value MIN and the maximum value MAX of the binarization threshold values allowing a two-dimensional code to be read, and is set as the binarization threshold value when the printing inspection is performed.

Figure 5:
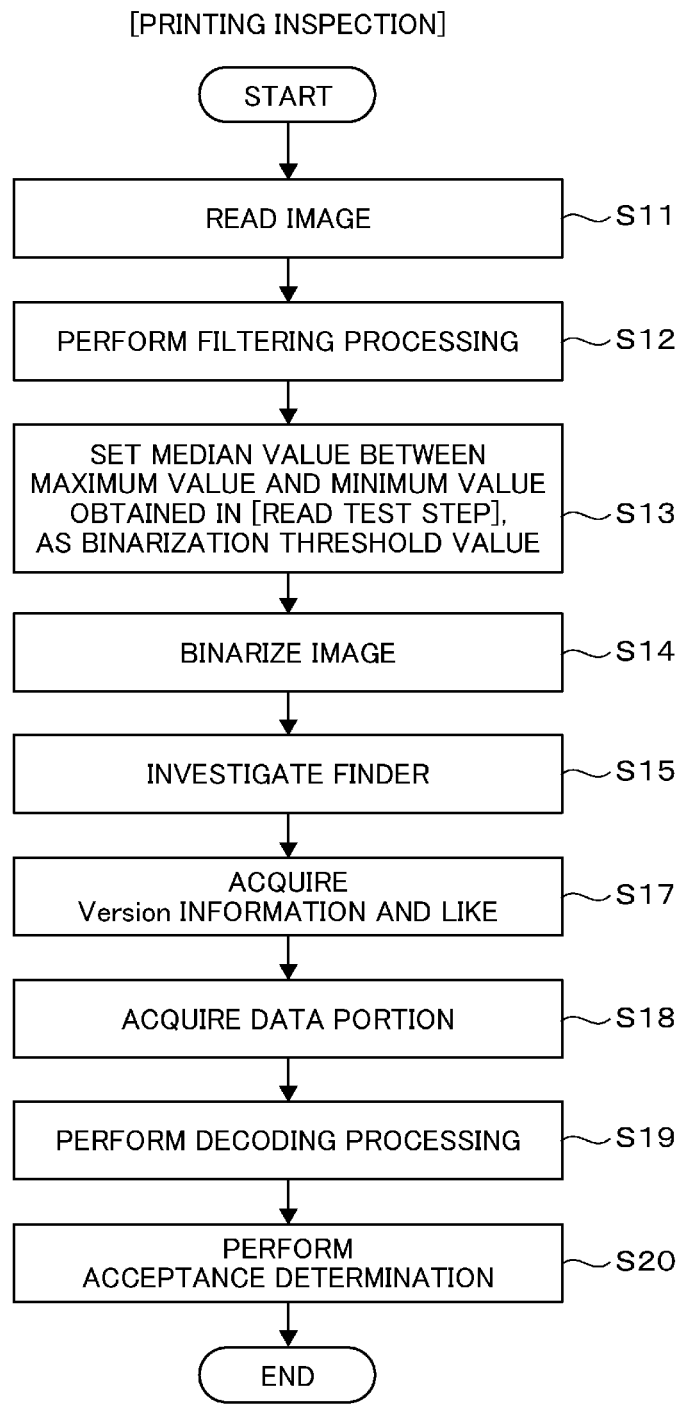
FIG. 5 illustrates an example of a flowchart for describing processing after image capturing in a printing inspection step of the processing unit in Example 1.

FIG. 5 illustrates an example of a flowchart of processing after image capturing in the "printing inspection step" of the processing unit 12 according to the printing inspection device of the present example. After the binarization threshold value is determined by the flowchart illustrated in FIG. 1, the practical printing inspection is performed by the flowchart illustrated in FIG. 5. The processing unit 12 in the printing inspection-device body 1 receives the output signal of the sensor 8, and then the camera 3 reads an image at a predetermined timing. In Step S11, the read image is stored once in the image storage unit 16.

Then, in Step S12, the filtering processing unit 125 in the processing unit 12 performs image improvement processing. In Step S13, the binarization threshold value setting unit 126 sets the median value obtained in the "read test" as the binarization threshold value. In Step S14, the image binarization processing unit 127 creates a binary image from a multi-level image with the binarization threshold value set in Step S13. The two-dimensional code computation unit 128 performs Steps S15 to S19. In Step S15, investigation of a finder (pattern for position detection) is performed based on the binary image. In Step S17, information (Version and the like) necessary for acquiring data is read based on the position of the finder. In Step S18, data is taken based on information obtained in Step S17. In Step S19, data (coded data) acquired in Step S18 is decoded to restore original data. In Step S20, the reading determination unit 129 performs acceptance determination on the read data.

Figure 6:
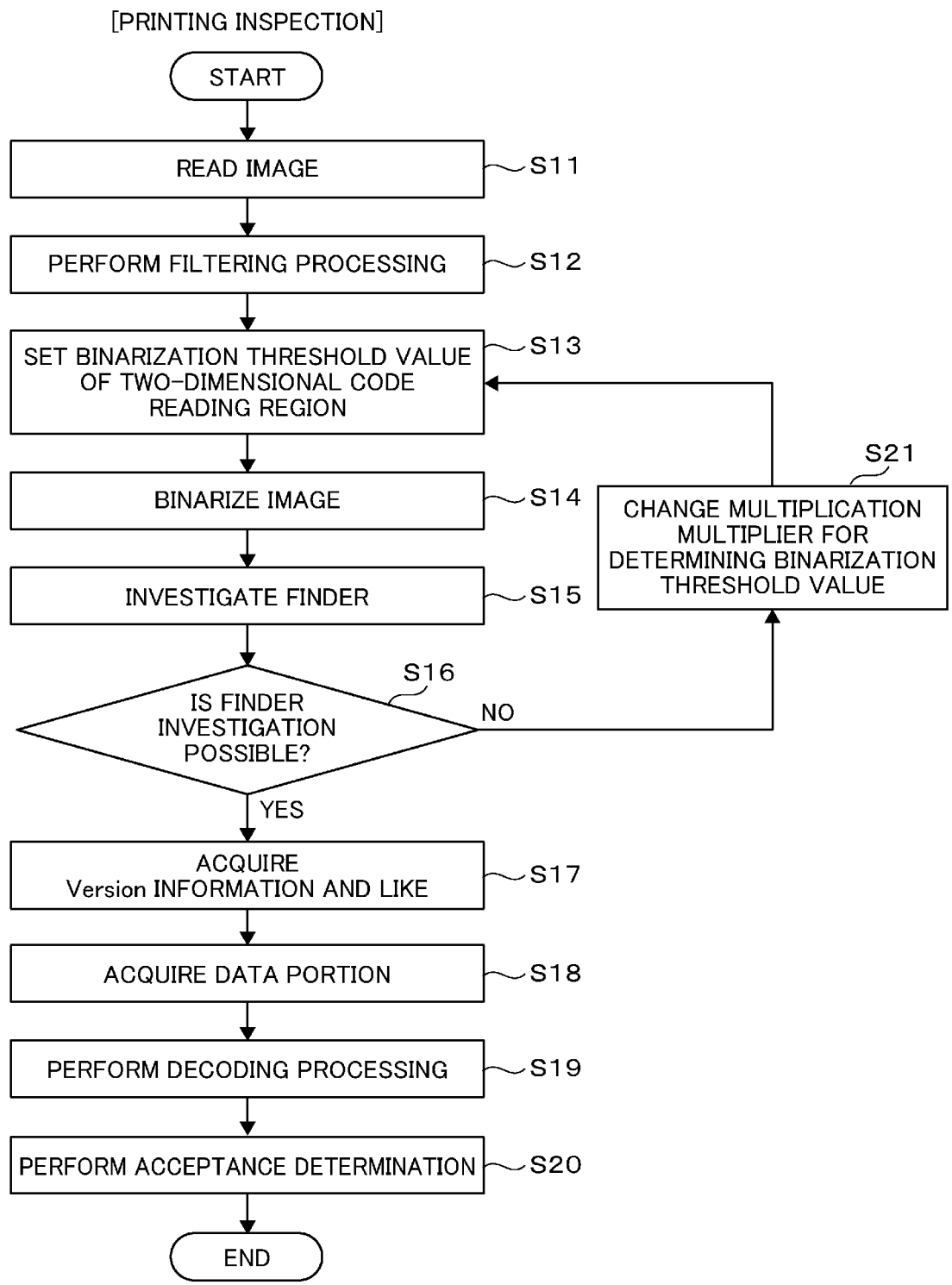
FIG. 6 illustrates an example of a flowchart for describing processing after image capturing in a printing inspection step in a printing inspection device in the related art.

Here, the conventional example of the printing inspection device will be described with reference to FIG. 6. In the conventional example, the processing unit 12 performs the [printing inspection step], not the [read test step]. Similar to FIG. 5, an image is captured in Step S11, and filtering processing is performed in Step S12. Then, in Step S14, a binary image is created from a multi-level image by using the binarization threshold value set as the default value in Step S13. In Step S15, the finder investigation is performed based on the binary image. In Step S16, it is determined whether or not the finder inspection is possible. When finder investigation is possible, the multiplication multiplier for determining the binarization threshold value is changed in Step S21. In Step S13, re-setting of the binarization threshold value, image binarization, and finder investigation are performed using the changed multiplication multiplier. Steps S21, S13, S14, S15, and S16 are repeated until the finder inspection is possible.

As described above, in the present example, all gradation values are used as the binarization threshold value by the [read test], the binarization of a multi-level image is performed to check whether or not reading of a two-dimensional code is possible, and the optimum binarization threshold value is set in advance. Thus, it is possible to prevent an increase in processing time due to resetting of the binarization threshold value and performing of the processing.

As described above, the printing inspection device in the present example captures an image including a two-dimensional code printed by a general-purpose printer such as an ink jet printer, in a form of a multi-level image. The printing inspection device creates a binary image from the multi-level image with a predetermined binarization threshold value, and then performs decoding. According to the printing inspection device, it is possible to obtain the optimum binarization threshold value without an occurrence of a situation in which the processing time becomes long by repeating binarization or a product is determined as a defective product because the code is not read within a desired time.

Example 2

In the present example, an example of a printing inspection device effective when the brightness of a captured image fluctuates by variations in the state of a printed matter and variations in the brightness of the lighting, and the like will be described with reference to FIGS. 7 and 8.

Figure 7:
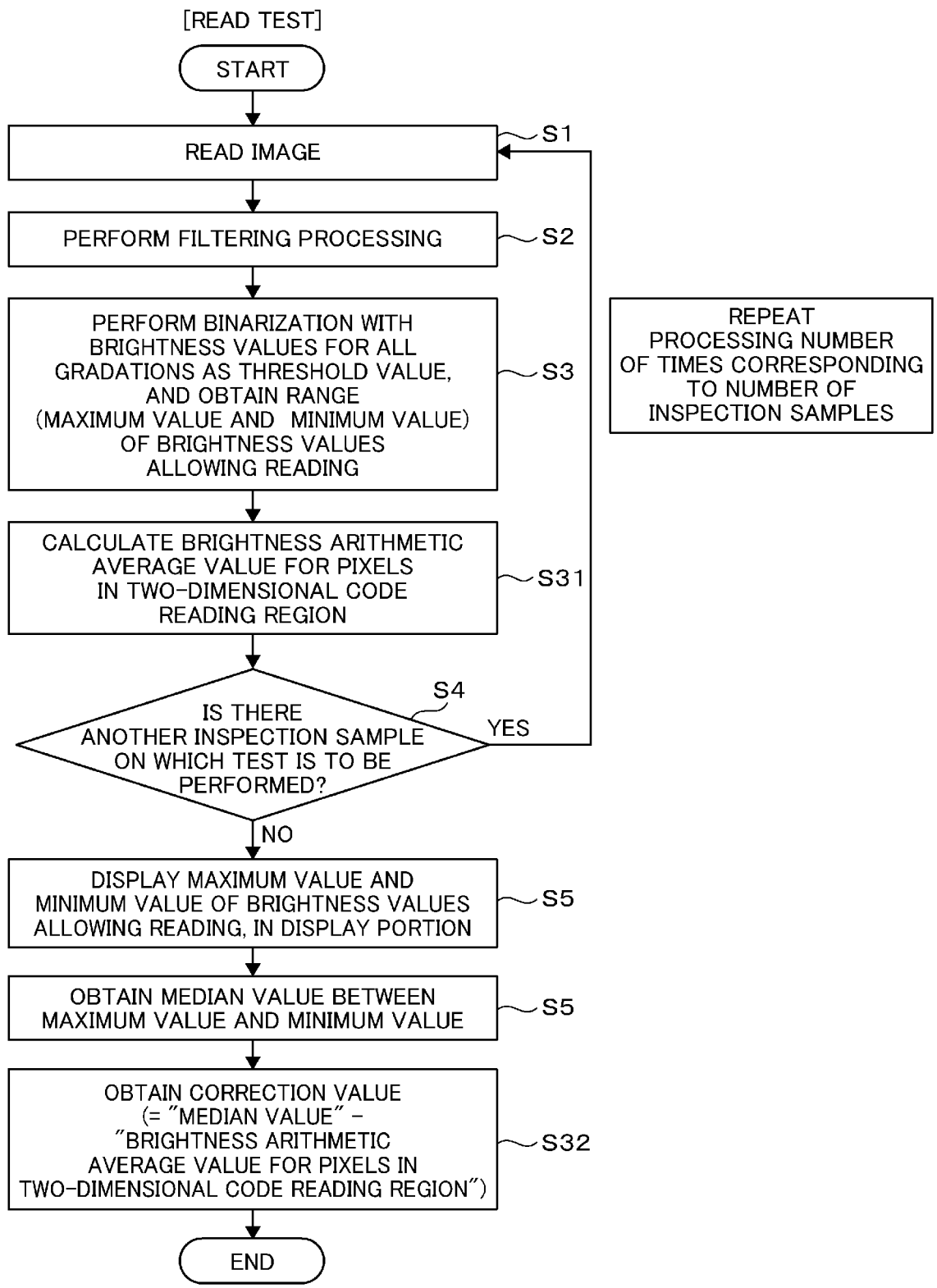
FIG. 7 illustrates an example of a flowchart for describing processing after image capturing in a read test step of a processing unit in Example 2.
Figure 8:
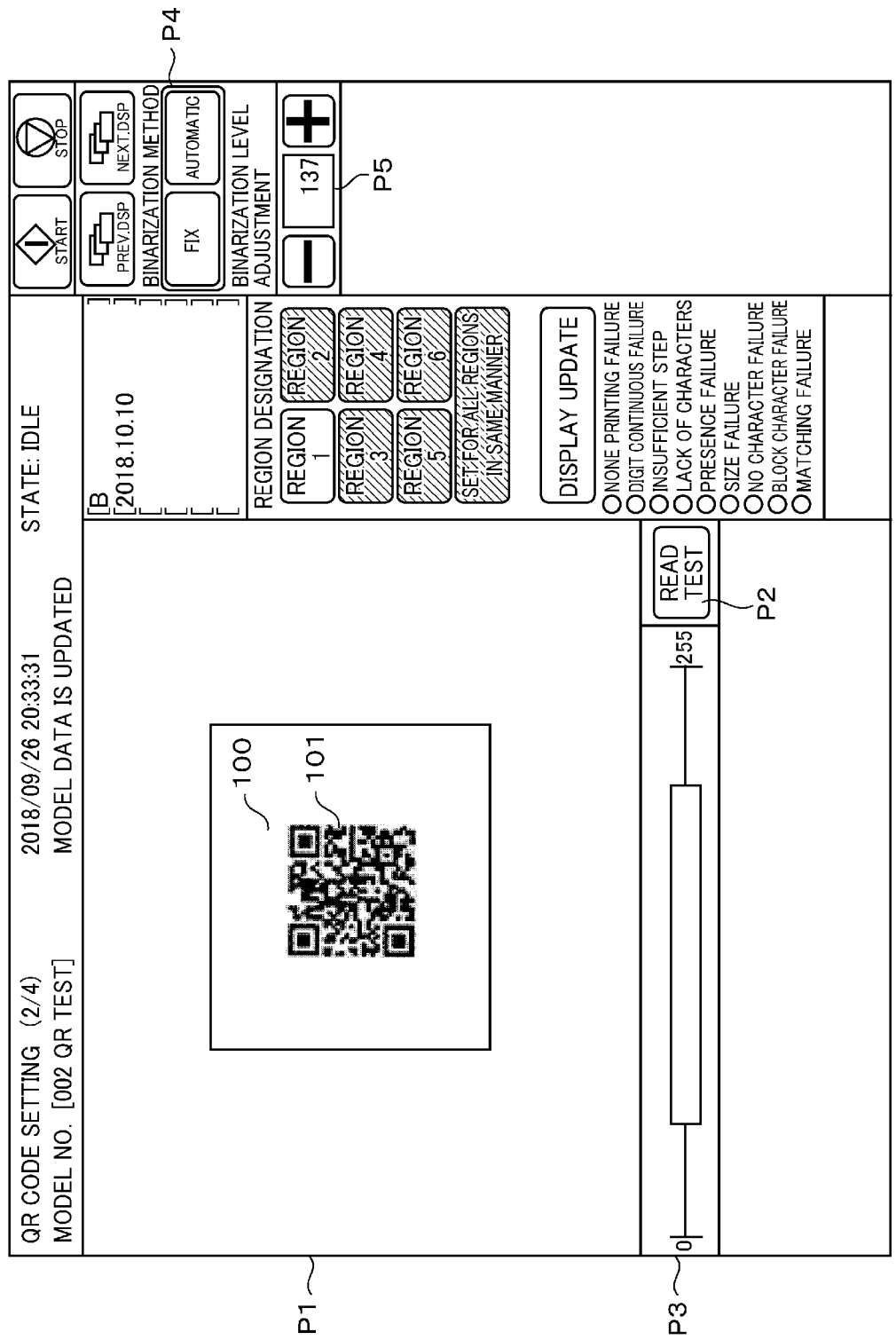
FIG. 8 illustrates a display example of a monitor in Example 2.

FIG. 7 illustrates an example of a flowchart of processing after image capturing in the [read test step] of the processing unit 12 in the printing inspection device in the present example. Similar to the case in FIG. 1, an image is captured in Step S1, filtering processing is performed in Step S2, and the minimum value MIN1 and the maximum value MAX1 of brightness values allowing reading are obtained in Step S3.

Then, an average brightness value AVE1 for all pixels in a two-dimensional code reading region is calculated in Step S31. Similar to the case in FIG. 1, regarding the number of inspection samples, one piece is possible, and two or more pieces are desirable to improve accuracy against variation. When two or more inspection samples are provided, processing from Step S1 is also performed on the second and the subsequent inspection samples. The minimum brightness threshold values MIN2, MIN3, . . . , the maximum brightness threshold values MAX2, MAX3, and all-pixel average brightness values AVE2, AVE3, . . . in the reading region, which are obtained by performing processing up to Step S31 are obtained. In addition, the minimum brightness threshold values, the maximum brightness threshold values, and the all-pixel average brightness values in the reading region, which correspond to the number of inspection samples, are obtained. The average values are obtained from the obtained brightness threshold values and set as the minimum brightness value MIN, the maximum brightness value MAX, and the all-pixel average brightness value AVE in the reading region, respectively.

In Step S5, the minimum brightness value MIN, the maximum brightness value MAX, and the all-pixel average brightness value AVE in the reading region are transmitted to the input and output unit 18 and are displayed on the monitor 2. In Step S6, the median value between the maximum value and the minimum value is obtained. In Step S32, correction value="median value" "all-pixel average brightness value in reading region" is obtained. FIG. 8 illustrates a display example. In the present example, a button for the binarization method selects "automatic" P4. As the result of the read test, which is displayed on the left of the "read test" button, similar to the case in FIG. 4, the minimum value of "51" and the maximum value of "198" in a range of the binarization threshold value allowing reading are displayed, and the median value of "125" is displayed. In addition, "137" which is the all-pixel average brightness value in the reading region is displayed in P5. When a specific numerical value is intended to be determined by using the binarization threshold value as a fixed value, an operator can input the numerical value in this display region. Then, "−12" is stored as the correction value in the processing unit 12.

Figure 9:
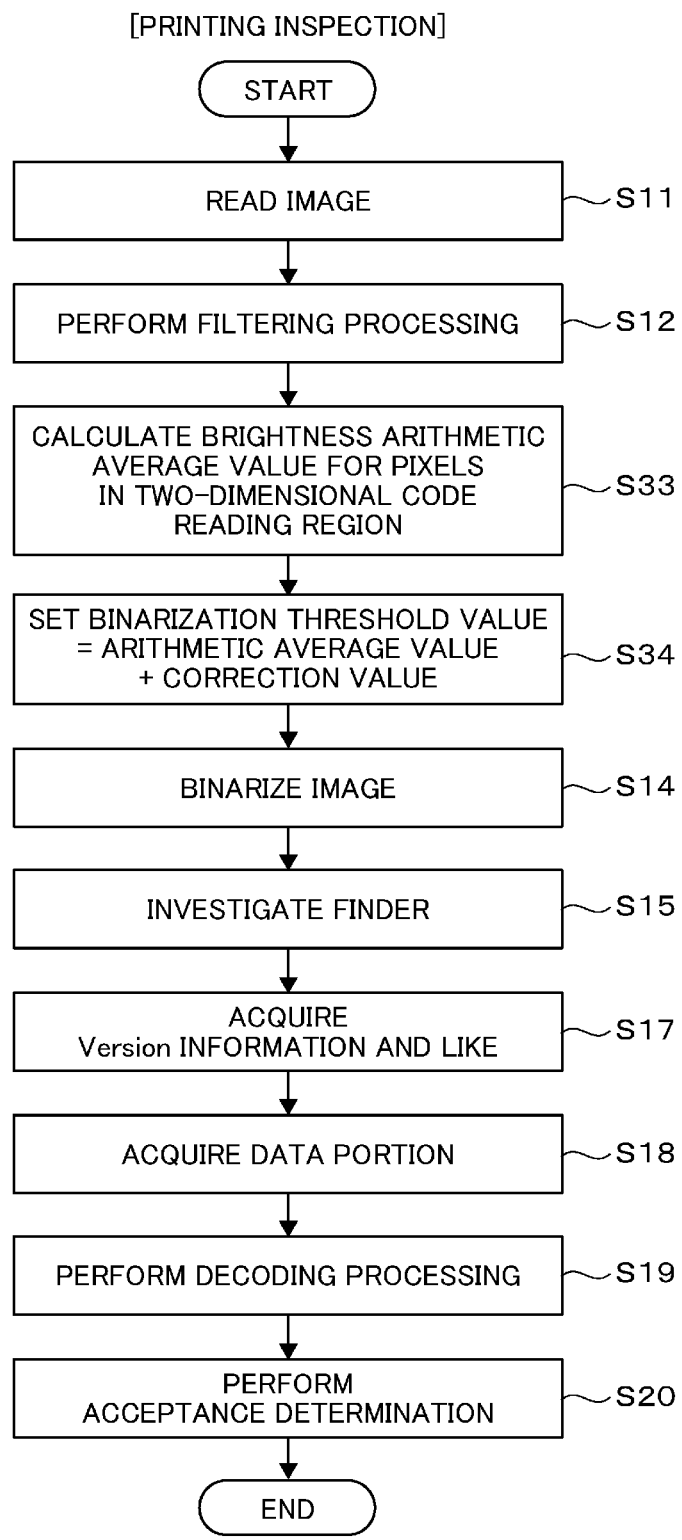
FIG. 9 illustrates an example of a flowchart for describing processing after image capturing in a printing inspection step of the processing unit in Example 2.

In the [printing inspection step] illustrated in FIG. 9, similar to FIG. 5, an image is captured in Step S11, and filtering processing is performed in Step S12. Then, the average brightness value for all pixels in the reading region is calculated in Step S33. In Step S34, a numerical value obtained by adding the correction value obtained in the [read test step] to the average brightness value for all pixels in the reading region is set as the binarization threshold value. In Step S14, a binary image is created from a multi-level image by using the binarization threshold value.

As described above, according to the present example, for each inspection of an inspection target, the average brightness value for all pixels in the reading region is calculated, the numerical value obtained by adding the correction value to the average value is set as the binarization threshold value, and binarization of a multi-level image is performed with the binarization threshold value. Thus, even when the brightness of the image fluctuates, it is possible to set the optimum binarization threshold value and read a two-dimensional code.

Note that, the present invention is not limited to the above-described examples, and various modifications are included. For example, a case where an image of a two-dimensional code is a QR code (registered trademark) is displayed in the example. Similar processing can be applied to other two-dimensional codes.

In addition, when two or more inspection samples are provided, in the present examples, the average values of the obtained numerical values (average value of MIN1, MIN2, . . . is set as MIN, and average value of MAX1, MAX2, . . . is set as MAX) are set as the minimum binarization threshold value MIN and the maximum binarization threshold value MAX, respectively. However, when there are large variations, for example, a method of setting the maximum value of the minimum binarization threshold values MIN1, MIN2, . . . as MIN and setting the minimum value of the maximum binarization threshold values MAX1, MAX2, . . . as MAX is also effective.

In addition, in the processing unit 12, the processing unit performing the [read test step] and the processing unit performing the [printing inspection step] are set to be separate from each other. The processing units (for example, image capturing timing calculation units 121 and 124) that perform the same operation can be set as the same processing unit.

REFERENCE SIGNS LIST

1 Printing inspection-device body
2 Monitor
3 Camera
4 Lighting device
5 Conveyor
6 Printed matter
7 External device
8 Sensor
9 Ink jet printer
10 Print head
11 Droplet
12 Processing unit
13 ROM
14 RAM
15 Image input unit
16 Image storage unit
17 Image input signal generation unit
18 Input and output unit
19 Lighting control unit
121 Image capturing timing calculation unit in [read test step]
122 Filtering processing unit in [read test step]
123 Binarization threshold value setting unit in [read test step]
124 Image capturing timing calculation unit in [printing inspection step]
125 Filtering processing unit in [printing inspection step]
126 Binarization threshold value setting unit in [printing inspection step]
127 Image binarization processing unit
128 Two-dimensional code computation unit
129 Reading determination unit
P1 Two-dimensional code-image display portion of monitor screen
P2 [Read test] start button display portion
P3 Read test result display portion
P4 Display portion of "automatic" setting button for setting in which correction value is automatically added to binarization threshold value
P5 Portion for displaying all-pixel average brightness value in reading region and inputting binarization threshold value
100 Reading region in image display portion of monitor screen

101 Two-dimensional code image in image display portion of monitor screen

The invention claimed is:

1. A printing inspection device that reads printing including a two-dimensional code printed on a printing target, the device comprising:
   means for inputting a recognition target including a two-dimensional code in a form of a multi-level image;
   image binarization means for binarizing the multi-level image with a predetermined binarization threshold value and outputting a binary image;
   two-dimensional code detection means for detecting a region of a two-dimensional code from the binary image;
   decoding means for decoding the two-dimensional code; and
   read test means for performing a read test,
   wherein the read test means
      performs a read test by binarizing one or more inspection samples with brightness values for all gradations, as a threshold value,
      obtains a maximum value and a minimum value of readable brightness values,
      causes the obtained maximum value and minimum value to be displayed in a display portion, and
      sets a median value between the minimum value and the maximum value, as a binarization threshold value for a two-dimensional code image in a practical printing inspection.

2. The printing inspection device according to claim 1, wherein when the read test is performed,
   an average brightness value for all pixels in a printing read region, and
   a difference between the calculated average brightness value and the median value is obtained as a correction value,
   in the practical printing inspection,
   the average brightness value for all pixels in the printing read region is calculated for each inspection target, and
   the multi-level image is binarized with a numerical value obtained by adding the correction value to the brightness average value, as the binarization threshold value.

* * * * *